United States Patent
Hwang

(10) Patent No.: US 9,245,343 B1
(45) Date of Patent: Jan. 26, 2016

(54) REAL-TIME IMAGE GEO-REGISTRATION PROCESSING

(71) Applicant: Patrick Y. Hwang, Cedar Rapids, IA (US)

(72) Inventor: Patrick Y. Hwang, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 315 days.

(21) Appl. No.: 13/852,081

(22) Filed: Mar. 28, 2013

(51) Int. Cl.
*G06K 9/00* (2006.01)
*G06T 7/00* (2006.01)

(52) U.S. Cl.
CPC ..... *G06T 7/0044* (2013.01); *G06T 2207/10032* (2013.01); *G06T 2207/20076* (2013.01)

(58) Field of Classification Search
None
See application file for complete search history.

(56) References Cited

U.S. PATENT DOCUMENTS

| 2006/0210169 | A1* | 9/2006 | Colestock | G06K 9/0063 382/218 |
| 2009/0024371 | A1* | 1/2009 | Xu | G06T 17/05 703/2 |
| 2011/0064312 | A1* | 3/2011 | Janky et al. | 382/195 |
| 2011/0143707 | A1* | 6/2011 | Darby et al. | 455/404.2 |
| 2011/0316854 | A1* | 12/2011 | Vandrovec | G06T 17/005 345/420 |
| 2012/0274505 | A1* | 11/2012 | Pritt et al. | 342/25 A |
| 2013/0243250 | A1* | 9/2013 | France et al. | 382/103 |

OTHER PUBLICATIONS

Geostatistics in ILWIS, international archives of Photogrammetry and remote sensing, vol. XXXIII, PartB4, Amsterdam May 2000; Hendrikse et al.*

* cited by examiner

*Primary Examiner* — Nancy Bitar
(74) *Attorney, Agent, or Firm* — Angel Gerdzhikov; Donna Suchy; Daniel Barbieri

(57) ABSTRACT

A geo-registration system with a camera receives an image of a scene, identifies features in the image, and computes vectors for each feature based on the known location and orientation of the camera. The system then compares the computed vectors to vectors associated with the same features identified in prior images. The geo-registration system then uses stochastic kriging techniques to create a geo-registration model based on the vectors.

20 Claims, 5 Drawing Sheets

REAL-TIME IMAGE GEO-REGISTRATION PROCESSING

FIELD OF THE INVENTION

The present invention is directed generally toward real-time geo-location.

BACKGROUND OF THE INVENTION

Full image geo-registration from an airborne platform for Wide Area Moving Imagery (WAMI) is currently a computationally intensive batch process that is conducted in post-mission processing. Jet Propulsion Laboratory (JPL)'s batch processing model for the Air Force Research Lab (AFRL) Angel Fire program is an example of the state of the art. Another example of image geo-registration is made by a scene correlation module in the Precision Strike Suite for Special Operations Forces (PSS-SOF) but requires high bandwidth access to reference geo-registered imagery from an external database.

Image geo-registration requires that, for each and every image, all parts of that image must be assigned a geo-reference tied to some chosen reference coordinate frame along with an expected error measure consistent with the statistical uncertainty of that geo-reference. For imagery captured by a passive monocular Electro-Optical/Infrared (EO/IR) sensor, the challenge involved in geo-registration is that the landmarks seen in the physical scenery cannot be instantaneously geo-located, but can be geo-located only when combined with information from imagery taken from a different point of view of the same landmarks.

Consequently, it would be advantageous if an apparatus existed that is suitable for real-time geo-location and geo-registration.

SUMMARY OF THE INVENTION

Accordingly, the present invention is directed to a novel method and apparatus for real-time geo-location and geo-registration.

In one embodiment of the present invention, a geo-registration system with a camera receives an image of a scene, identifies features in the image, and computes vectors for each feature based on the known location and orientation of the camera. The system then compares the computed vectors to vectors associated with the same features identified in prior images. The geo-registration system then uses stochastic kriging techniques to create a geo-registration model based on the vectors.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
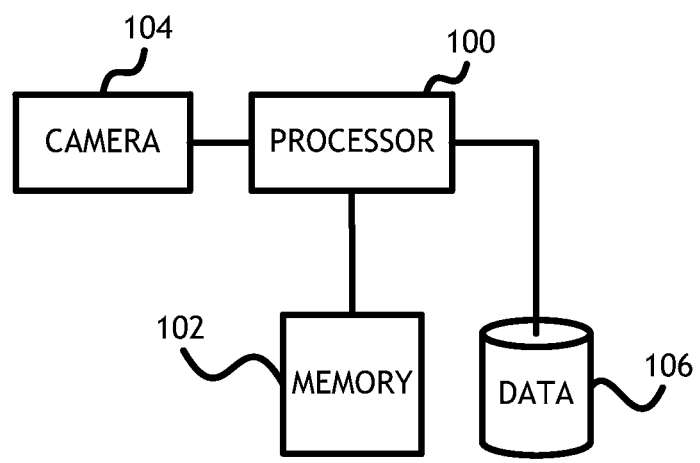
FIG. 1 shows a block diagram of a computer apparatus useful for implementing embodiments of the present invention.

Referring to FIG. 1, a block diagram of a computer apparatus useful for implementing embodiments of the present invention is shown. In at least one embodiment, a processor 100 executing program code contained in a memory 102 receives a current terrain image from a camera 104. The processor 100 identifies features in the current terrain image and calculates one or more current vectors associated with each feature based on a known location and orientation of the camera where the current terrain image was taken. Each current vector may include a feature identification code. Furthermore, each current vector may include a noise value indicating a level of uncertainty associated with the vector. The processor 100 then retrieves prior vectors associated with same features based on feature identification codes from a data storage element 106. In at least one embodiment, the current vectors are stored in the data storage element 106 for use in subsequent geo-location processes.

To geo-register the entire current image, the apparatus needs to extract a large number of features from the current image that correspond to stationary landmarks. These features would have sufficiently distinct characteristics such that the processor 100 can reliably and continuously track them in successive images while the features remain in the field of view of the camera 104. Each feature is geo-located using an image measurement of the feature from the current terrain image combined with an image measurement of the same feature from one or more prior images.

For each feature in the current terrain image, the processor 100 selects one or more prior vectors to calculate a model of the terrain. In at least one embodiment, prior vectors are selected based on distance or disparity of viewing angle as compared to the current vector. Vectors calculated from widely different locations or viewing angles tend to produce more accurate terrain models. Once the processor 100 has calculated a terrain model, the processor 100 may accurately determine a location for any point of interest in the current terrain image. Prior vectors for each feature in the current image may be calculated from different prior images based on the characteristics of the particular feature. Measurement geometry and solution accuracy may therefore vary from feature to feature.

In at least one embodiment, the processor 100 calculates the terrain model using kriging interpolation. Kriging interpolation is a geo-statistical estimation technique for inferring unknown values such as elevations in a geographic coordinate system based on samples such as the current vectors and prior vectors derived from feature points. In at least one embodiment, the processor 100 uses stochastic kriging which is a kriging methodology that further incorporates uncertainty based on the noise value associated with each vector. Conventional kriging treat samples as perfect. Because vectors used in embodiments of the present invention may include noise, stochastic kriging is used with a specification of an associated covariance matrix which thereby provides smoothing of the noisy samples as well. This mechanism also allows indirect introduction of more accurate geo-location information of geo-referenced features from other external sources as well as prior information (with uncertainty). The kriging coefficients are used to interpolate the geo-reference for any point in the image and can be tailored to accommodate any desired standard metadata output formats.

The computer apparatus is intended to operate autonomously on an airborne platform without database access and only relies on standard navigation sensors on the platform. Real-time processing generates metadata from imagery captured on the platform. The methods described herein are scalable according to the computational capacity available for the platform.

Embodiments of the present invention are scalable for real-time implementation on the basis of available processing capacity. After geo-locating features, their individual position solutions can be improved by "connecting" the solution information through a spatial smoothing process that can also interpolate a geo-reference for any point in between the features in the current terrain image.

Figure 2:
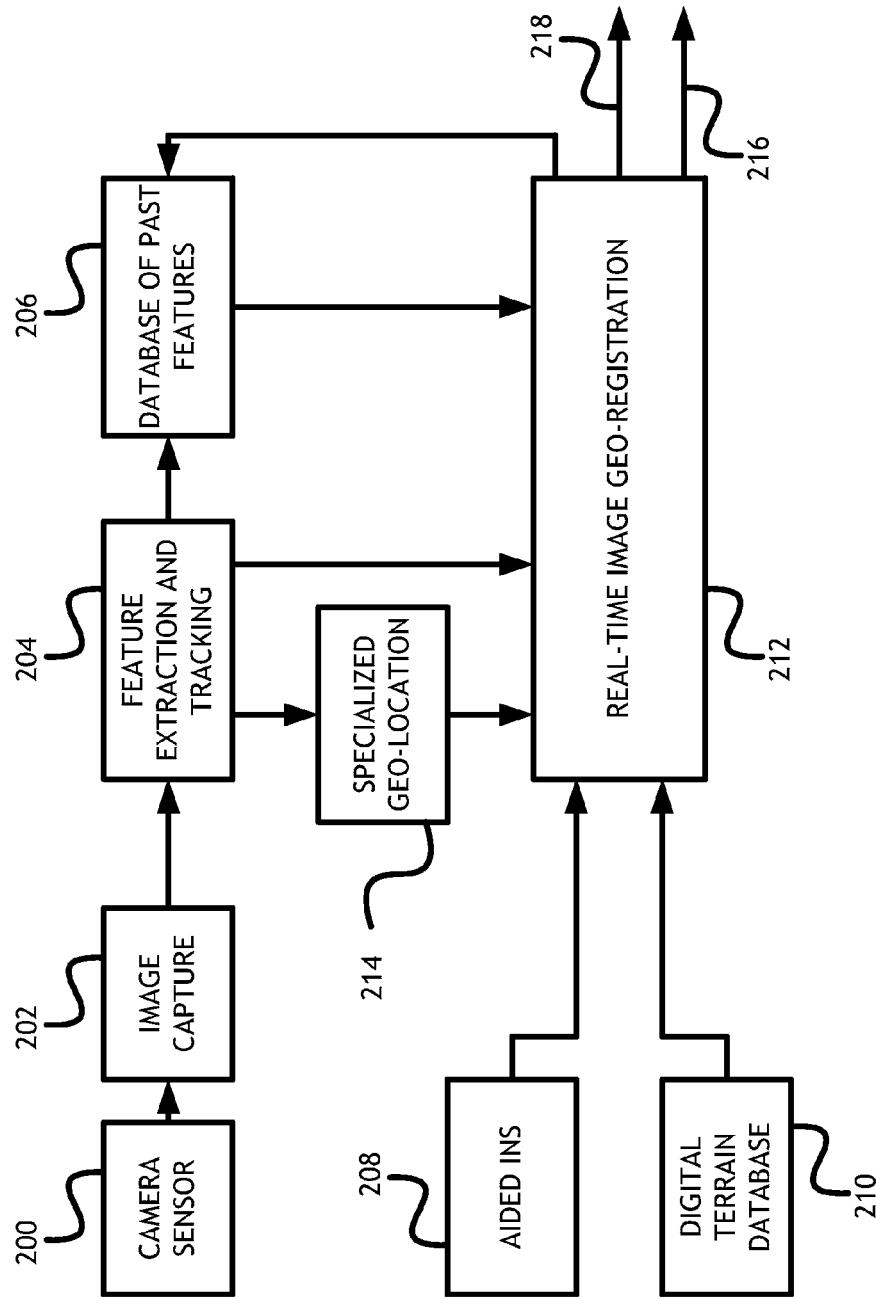
FIG. 2 shows a block diagram of system for real-time modeling of geo-locations according to embodiments of the present invention.

Referring to FIG. 2, a block diagram of system for real-time modeling of geo-locations according to embodiments of the present invention is shown. In at least one embodiment, a camera sensor 200 captures 202 a current image. A processor identifies and extracts 204 features from the current image, assigning or correlating each feature with a feature identification code. The processor calculates a current vector for each feature; the current vector may include the location of the current image and a noise value indicating an uncertainty as to the vector. Noise may be based on one or more characteristics of the inputs from the camera sensor used to calculate each current vector, signal noise in one or more channels used to receive such inputs, limitations of accuracy from the measurement geometry associated with the vectors used for the geo-location of each feature or any other mechanism that might generate a level of uncertainty. The current vectors may be stored in a database 206 of vectors for use in subsequent comparisons. The current vectors are then sent to a real-time image geo-registration element 212. The real-time image geo-registration element 212 also receives prior vectors from the database 206 of vectors and produces a geo-registered image 218, useful for locating any point of interest in a terrain image. The real-time image geo-registration element 212 may also produce one or more error characterizations 216 associated with at least one vector. Where the real-time image geo-registration element 212 characterizes landmark locations and current terrain image features, such vectors may be stored in the database 206 of vectors.

Real-time processing of the large number of features needed for high-fidelity image geo-registration is enabled by computing geo-location solutions with simple vector math that solves for the closes proximity intersection between line vectors from a current image and prior images, but constrained to the vectors from the current image. The prior image used for each feature geo-location solution may vary from one feature to another. Flexibility in image selection allows geo-location accuracy for each feature to be maximized independently. For a given feature, data from more than one prior image may be used if doing so significantly raises the geo-location solution robustness without severely increasing computational costs.

In at least one embodiment, features may be processed through a specialized geo-location element 214 to identify known landmarks. Such landmarks may be well characterized and therefore given added weight in subsequent calculations.

The real-time image geo-registration element 212 may receive input from an aided inertial navigation system 208 to define a reference location and orientation of the camera to determine where each current vector originates. The real-time image geo-registration element 212 may also receive a reference terrain from a digital terrain database 210. If a reasonably accurate terrain elevation database is available and landmarks are known to be constrained to that terrain, such information may be used during geo-location.

Figure 3:
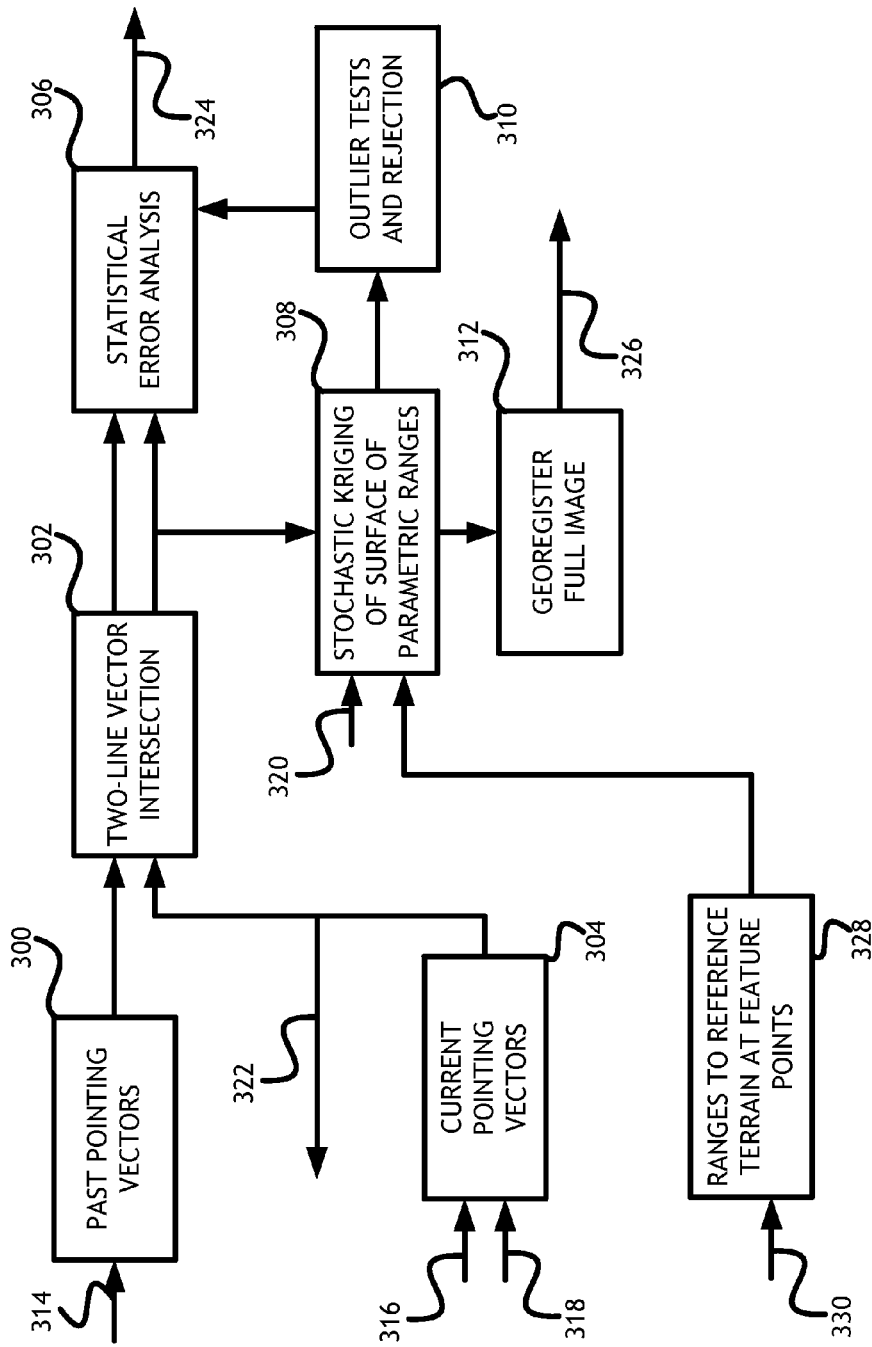
FIG. 3 shows a block diagram of a real-time image geo-registration element for modeling geo-locations according to embodiments of the present invention.

Referring to FIG. 3, a block diagram of a real-time image geo-registration element for modeling feature geo-locations according to embodiments of the present invention is shown. In at least one embodiment, the real-time image geo-registration element receives prior vectors 314 associated with features identified in a current terrain image. Alternatively, a past vector element 300 may receive prior vector from a vector database and identify prior vectors associated with features in a current terrain image, potentially based on a feature identification code. The real-time image geo-registration element also receives a reference location 316 and orientation from an aided inertial navigation system and one or more features 318 associated with the current terrain image. A current vector element 304 may associate the one or more features 318 with the reference location 316 to produce one or more current vectors 322. The one or more current vectors 322 may be sent to a database of vectors for use when processing subsequent terrain images. Alternatively, the real-time image geo-registration element may receive one or more current vectors, each associated with a feature in a current terrain image.

A vector intersection element 302 receives a current vector associated with a feature in a current terrain image and one or more prior vectors associated with features identified in the current terrain image. The vector intersection element 302 uses the current vector and the one or more prior vectors to determine a location of the feature. The current vector and one or more prior vectors may not intersect exactly due to noise associated with each vector so the solution represents the intersection point of closest proximity between the vectors; the output from the vector intersection element 302 may be a parametric range associated with the feature. Output from the vector intersection element 302 may be sent to a statistical error analysis element 306 to characterize errors 324 in the vector intersection analysis. Output from the vector intersection element 302 may also be sent to a stochastic kriging element 308. The stochastic kriging element 308 may perform a stochastic kriging interpolation of features identified by the vector intersection element 302.

In order to apply stochastic kriging to solve the spatial smoothing and interpolation problem, the vector intersection element 302 may assume the location of a particular landmark in the current terrain image is somewhere along a ray from the image sensor to that landmark (current vector). When the current vector intersects another vector from a prior image to the landmark, the geo-location solution is constrained to the current vector, thereby leaving the uncertainty to be along the prior vector. This constraint allows the system to form a surface from geo-located dense features and apply stochastic kriging to adjust the individual results in one dimension of uncertainty. This application of stochastic kriging is not made directly to the geo-location solutions but rather to a related surface formed by the parametric ranges in the current view to all the dense feature geo-locations.

In at least one embodiment, the stochastic kriging element 308 may also receive a reference surface from a reference terrain element 328. A reference surface approximately captures the general "trend" that can be used as a starting point in enabling the stochastic kriging to do a better job at estimating differences from the reference surface rather than estimating the actual surface itself. The reference terrain element 328 may determine feature points based on a reference terrain 330 from a terrain database. The stochastic kriging element 308 may also receive one or more landmark references 320. Information pertaining to landmark references 320 may be particularly well vetted and therefore strongly weighted during stochastic kriging interpolation.

The model produced by the stochastic kriging element 308 may be sent to an outlier test element 310. The model provides a basis for statistical outlier rejection. Aberrant solutions are occasionally unavoidable due to miscorrelation or misassociation during feature correlation and tracking. The outlier test element 310 eliminates aberrant model solutions and sends corresponding information to the statistical error analysis element 306. Valid models may be sent to a geo-registration element 312 that associates the model with the current terrain image to produce a geo-registered image 326. Any point of interest in the geo-registered image 326 may be accurately located.

Figure 4:
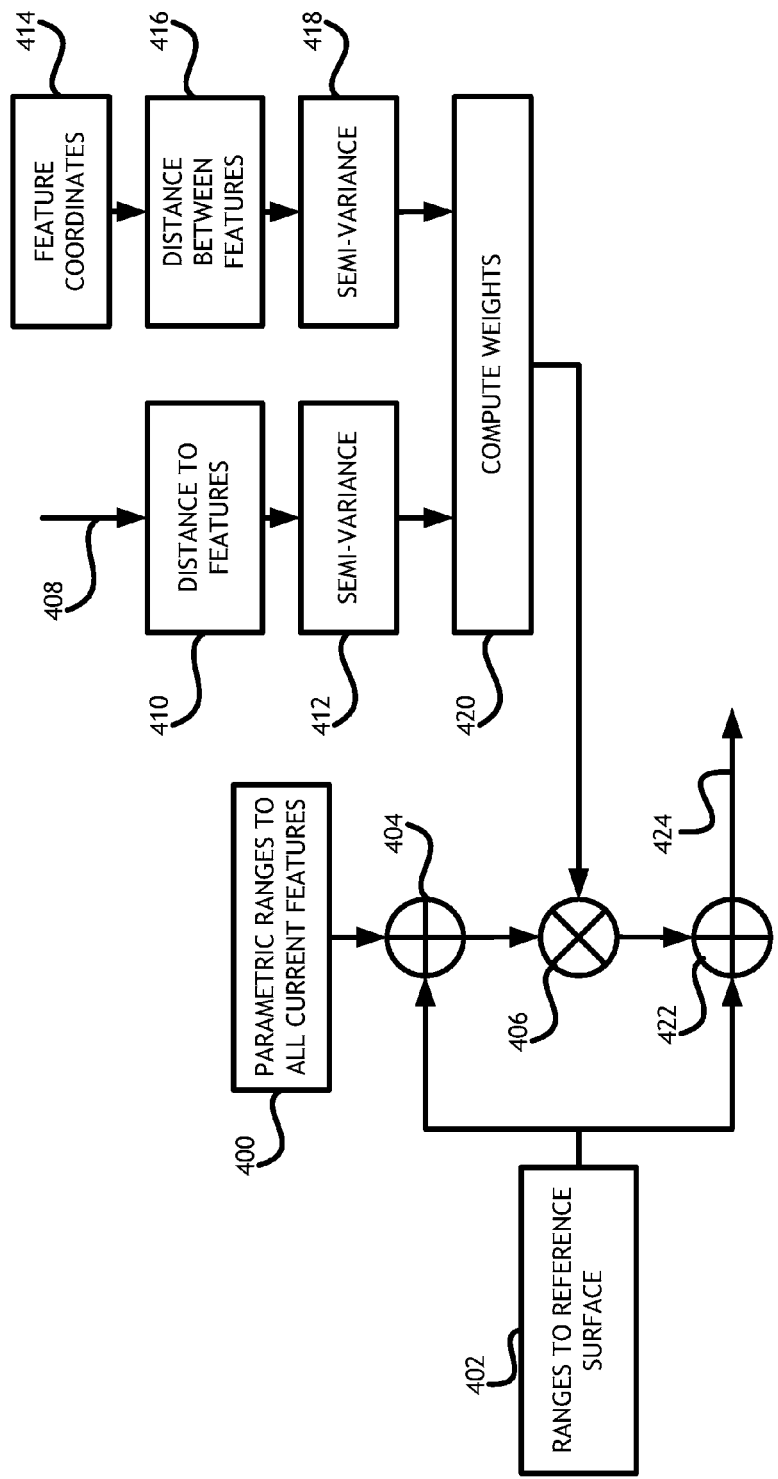
FIG. 4 shows a block diagram of a system for stochastic kriging analysis.

Referring to FIG. 4, a block diagram of a system for stochastic kriging analysis is shown. In at least one embodiment to the present invention, the system receives a point of interest 408. A distance element 410 determines a distance associated with the point of interest 408. A semi-variance element 412 then produces a spatial variability structure based on the distance to the point of interest 408 and some empirical function. Simultaneously, a distance differential element 416 determines distances between features based on calculated feature coordinates 414. A semi-variance element 418 then determines a spatial variability structure based on the distances between features and some empirical function. A weight computing element 420 receives each spatial variability structure and computes a weighting for each calculated feature coordinate.

In at least one embodiment, a differential element 404 receives one or more parametric ranges 400, each associated with a feature identified in two or more terrain images, and similar ranges 402 associated with a reference surface. The differential element 404 determines differences between the parametric ranges 400 and the ranges associated with the reference surface 402. The differences between the parametric ranges 400 and the ranges associated with the reference surface 402 are then adjusted according the weighted feature coordinates by a conjunction element 406. The adjusted differences are then added to the ranges associated with the reference surface 402 by an additive element 422 to produce a smoothed parametric range 424 associated with the point of interest.

Figure 5:
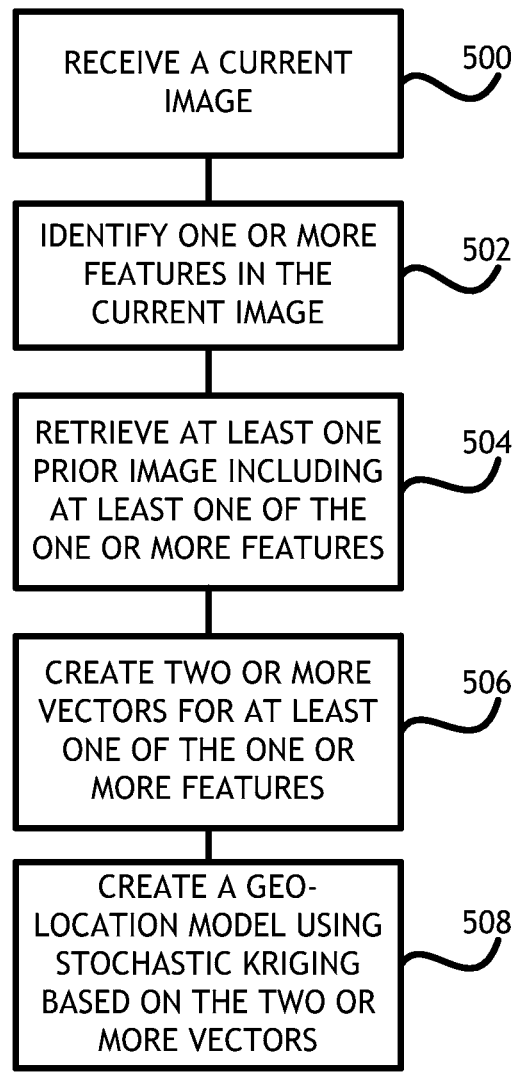
FIG. 5 shows a flowchart of a method for real-time modeling of geo-locations according to embodiments of the present invention.

Referring to FIG. 5, a flowchart of a method for real-time modeling of geo-locations according to embodiments of the present invention is shown. In at least one embodiment, a processor receives 500 a current terrain image and identifies 502 features in the current terrain image. Prior images including the identified features are then retrieved 504 from a data store. The prior images may comprise vectors computed from prior images when the prior images where current terrain images. The processor calculates 506 one or more current vectors associated with each feature based on a known location where the current terrain image was taken. Each current vector may include a feature identification code. Furthermore, each current vector may include a noise value indicating a level of uncertainty associated with the vector. The processor may also create 506 or retrieve prior vectors associated with same features based on feature identification codes. In at least one embodiment, the current vectors are stored in a data store for use in subsequent geo-location processes.

For each feature in the current terrain image, the processor selects one or more prior vectors to calculate 508 a model of the terrain. In at least one embodiment, prior vectors are selected based on distance or disparity of viewing angle as compared to the current vector. Vectors calculated from widely different perspectives or viewing angles tend to produce more accurate terrain models. Once the processor has calculated 508 a terrain model, the processor may accurately determine a location for any pixel in the current terrain image.

In at least one embodiment, the processor calculates 508 the terrain model using kriging interpolation. Kriging interpolation is a geo-statistical estimation technique for inferring unknown values such as elevations in a geographic coordinate system based on samples such as the current vectors and prior vectors derived from feature points. In at least one embodiment, the processor uses stochastic kriging which is a kriging methodology that further incorporates uncertainty based on the noise value associated with each vector.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for real-time geo-registration, comprising:
    identifying one or more features in a current image;
    computing one or more current vectors, each of the one or more current vectors associated with one of the one or more features in the current image, the one or more current vectors comprising a noise value indicating a level of uncertainty associated with the features in the current image based on characteristics of a camera sensor;
    identifying one or more prior vectors associated with a prior image, each of the one or more prior vectors associated with one of the features;
    computing one or more parametric ranges, each of the one or more parametric ranges based on a current vector and at least one prior vector; and
    computing a geo-registration using kriging interpolation of the one or more parametric ranges.

2. The method of claim 1, wherein the kriging interpolation is a stochastic kriging interpolation.

3. The method of claim 1, further comprising capturing a current image.

4. The method of claim 1, further comprising applying the geo-registration to the current image.

5. The method of claim 4, further comprising determining a location based on the geo-registered current image.

6. The method of claim 1, further comprising storing the one or more current vectors.

7. The method of claim 1, further comprising:
computing an error value associated with one or the one or more parametric ranges; and
eliminating one of the one or more parametric ranges based on the error value.

8. A computer apparatus comprising:
a processor;
a memory connected to the processor; and
computer executable program code configured to execute on the processor,
wherein the computer executable program code is configured to:
identify one or more features in a current image;
compute one or more current vectors, each of the one or more current vectors associated with one of the one or more features in the current image, the one or more current vectors comprising a noise value indicating a level of uncertainty associated with the features in the current image based on characteristics of a camera sensor;
identify one or more prior vectors associated with a prior image, each of the one or more prior vectors associated with one of the features;
compute one or more parametric ranges, each of the one or more parametric ranges based on a current vector and at least one prior vector; and
compute a geo-registration using kriging interpolation of the one or more parametric ranges.

9. The computer apparatus of claim 7, wherein the kriging interpolation is a stochastic kriging interpolation.

10. The computer apparatus of claim 7, further comprising a data storage element connected to the processor, wherein computer executable program code is further configured to store the one or more prior vectors in the data storage element.

11. The computer apparatus of claim 9, wherein the computer executable program code is further configured to store the one or more current vectors on the data storage element.

12. The computer apparatus of claim 7, further comprising a camera, wherein the computer executable program code is further configured to capture a current image through the camera.

13. The computer apparatus of claim 7, wherein the computer executable program code is further configured to apply the geo-registration to the current image.

14. The computer apparatus of claim 11, wherein the computer executable program code is further configured to determine a location based on the geo-registered current image.

15. An airborne geo-registration platform comprising:
a processor;
a camera connected to the processor;
a data storage element connected to the processor;
a memory connected to the processor; and
computer executable program code configured to execute on the processor,
wherein the computer executable program code is configured to:
capturing a current image through the camera;
identify one or more features in a current image;
compute one or more current vectors, each of the one or more current vectors associated with one of the one or more features in the current image, the one or more current vectors comprising a noise value indicating a level of uncertainty associated with the features in the current image based on characteristics of the camera;
identify one or more prior vectors associated with a prior image, each of the one or more prior vectors associated with one of the features;
compute one or more parametric ranges, each of the one or more parametric ranges based on a current vector and at least one prior vector; and
compute a geo-registration using kriging interpolation of the one or more parametric ranges.

16. The airborne geo-registration platform of claim 14, wherein the kriging interpolation is a stochastic kriging interpolation.

17. The airborne geo-registration platform of claim 14, wherein the computer executable program code is further configured to store the one or more prior vectors in the data storage element.

18. The airborne geo-registration platform of claim 16, wherein the computer executable program code is further configured to store the one or more current vectors in the data storage element.

19. The airborne geo-registration platform of claim 14, wherein the computer executable program code is further configured to apply the geo-registration to the current image.

20. The airborne geo-registration platform of claim 19, wherein the computer executable program code is further configured to determine a location based on the geo-registered current image.

* * * * *